United States Patent [19]
Yamada

[11] Patent Number: 5,152,722
[45] Date of Patent: Oct. 6, 1992

[54] TRANSMISSION BELT ASSEMBLY

[75] Inventor: Kazuhiro Yamada, Yokohama, Japan

[73] Assignee: Nissan Motor Co., Ltd., Yokohama, Japan

[21] Appl. No.: 735,924

[22] Filed: Jul. 25, 1991

[30] Foreign Application Priority Data

Jul. 25, 1990 [JP] Japan .................................. 2-194863

[51] Int. Cl.$^5$ .............................................. F16G 1/22
[52] U.S. Cl. ..................................... 474/240; 474/242
[58] Field of Search ........................ 474/237, 240–244, 474/201

[56] References Cited

U.S. PATENT DOCUMENTS

| | | | |
|---|---|---|---|
| 4,619,634 | 10/1986 | Nakawaki | 474/242 X |
| 4,813,920 | 3/1989 | Inukai et al. | 474/240 |
| 4,894,049 | 1/1990 | Koppelaars | 474/242 X |

Primary Examiner—Thuy M. Bui
Attorney, Agent, or Firm—Foley & Lardner

[57] ABSTRACT

An endless transmission belt assembly for a power transmission mechanism includes an endless belt element of a laminated structure, and a number of segmentary block elements aligned in a longitudinal direction of the belt element. A belt recess is formed in the block element for passing the belt element therethrough, having a contact surface which is brought into contact with innermost surface of the belt element. A rocking edge is provided for the block element, which comes into contact with an adjacent block element as relevant span portion of the belt assembly is wound around the pulley, causing a relative rocking motion of adjacent blocks. The block elements are constituted of no less than two kinds of block elements of mutually different radial distance between the contact surface of the belt recess and the rocking edge.

7 Claims, 2 Drawing Sheets

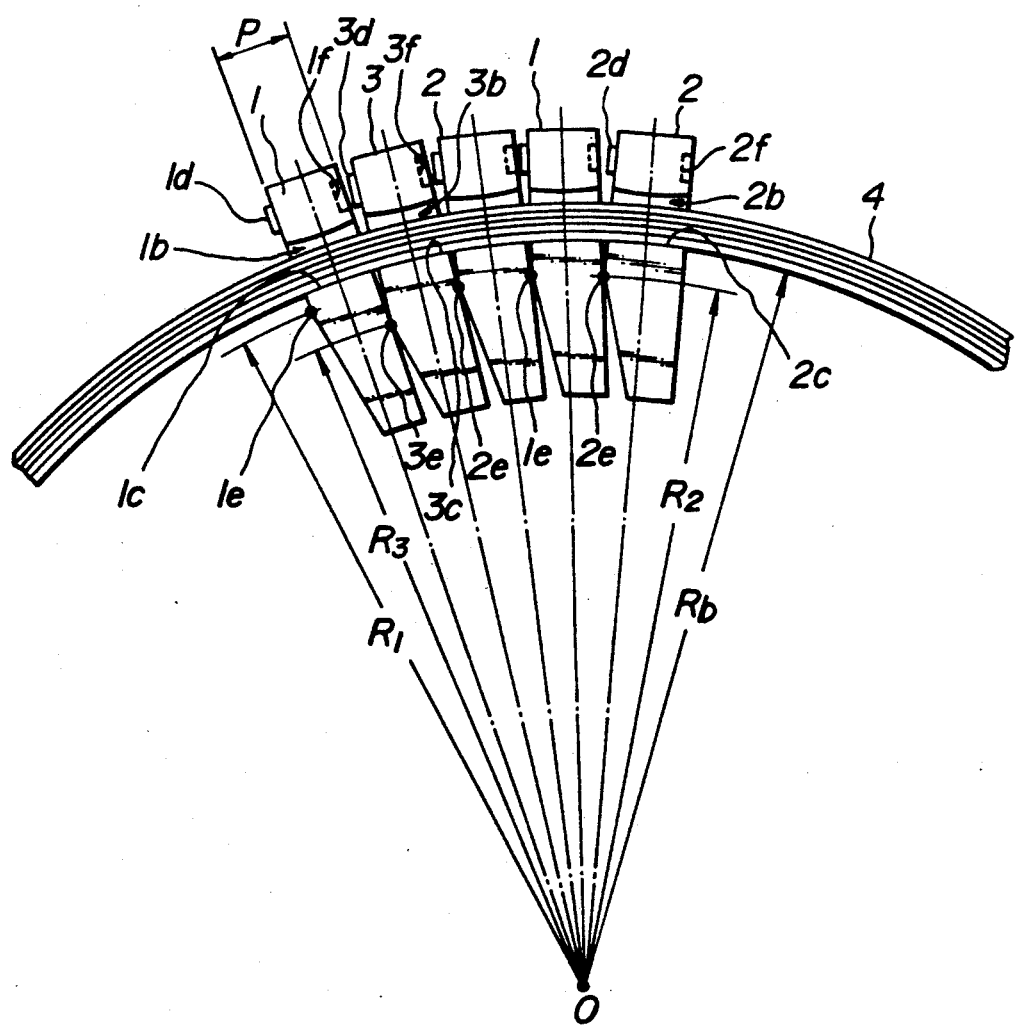
FIG_1

FIG_2
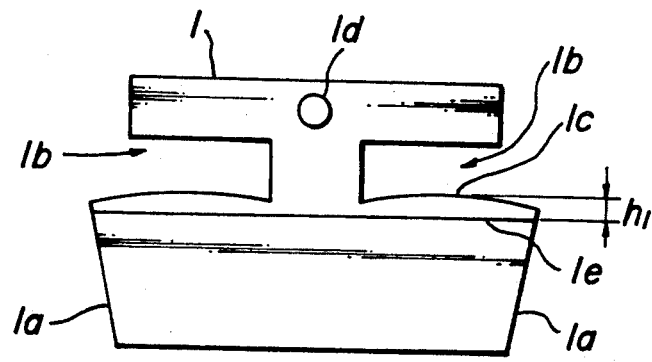
FIG_3
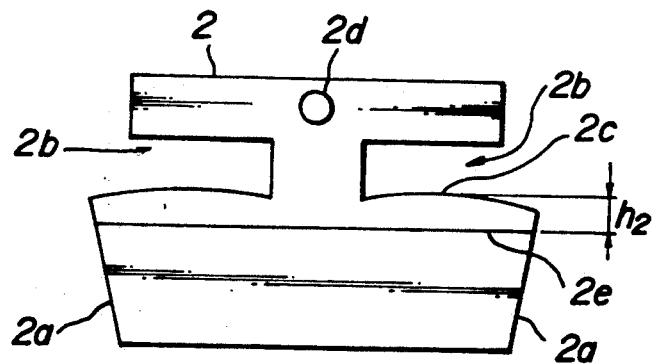
FIG_4
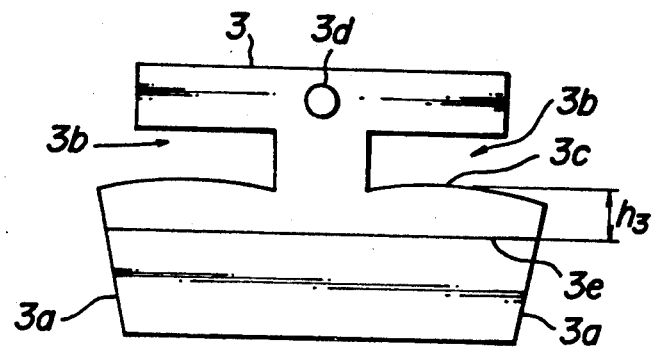

TRANSMISSION BELT ASSEMBLY

BACKGROUND OF THE INVENTION

1. Field of the Invention

The present invention relates to an endless transmission belt assembly which may be suitably used for transmitting power between driving and driven pulleys of a continuously variable power transmission mechanism for an automotive vehicle and the like.

2. Description of the Related Art

A typical example of such endless transmission belt assembly is disclosed, e.g., Japanese Utility Model Application Laid-Open Publication No. 53-76844. The known transmission belt assembly in use is passed between driving and driven pulleys of the power transmission mechanism for transmitting power therebetween, of which each pulley is formed with a circumferential belt groove of substantially V-shaped cross-section. The belt assembly is constituted by an endless belt element of a laminated structure formed of a plurality of metal belt layers, and a number of segmentary block elements of substantially V-shaped cross-section to be received in the belt groove of each pulley, and aligned in a longitudinal direction of the belt element.

In the known transmission belt assembly mentioned above, each block element is formed with a belt recess for passing the belt element therethrough with a contact surface which is brought into contact with innermost circumferential surface of the belt element. Each block element is further provided with a rocking edge which comes into contact with an adjacent block element as a relevant span portion of the belt assembly is wound around the pulley, causing a rocking motion of the block element relative to the adjacent block element.

More particularly, when a span portion of the belt assembly is wound around a pulley, each block element is tilted by a predetermined angle with its rocking edge as the tilting axis, following the winding radius of curvature of the belt element. Power is transmitted as each block element undergoes a wedge-contact with opposite walls of the belt groove in the pulley, accompanying contact of adjacent pair of the block elements with each other at the rocking edge. On this occasion, the winding radius of the block element is the radial distance R between the center of the pulley and the rocking edge, and corresponds to the pitch circle radius. Accordingly, assuming the winding radius of the innermost circumferential surface of the belt element to be $R_b$, and the radial distance between the rocking edge and the contact surface of the belt recess to be h, the radial distance R can be expressed as $R = R_b - h$. The radial location of the rocking edge and hence of the magnitude of the radial distance between the rocking edge and the contact surface of the belt recess is determined such that each block element is applied with an adequate tilting or rocking moment.

The aforementioned block elements of the conventional transmission belt assembly is constituted solely by a single kind of element of the same size, so that all the block elements are wound around the pulley at a constant time interval. Consequently, the level of peaky noise with a specific frequency component tends to become so high that it causes the user, i.e. driver and/or passengers when the transmission belt assembly is used in a power transmission mechanism of an automotive vehicle, feel uncomfortable.

While there has been a proposal to constitute a belt assembly by means of a plurality of kinds of block elements which are mutually different in width, thereby to disperse the frequency range of the noise and reduce the overall noise level, such a proposal is considered to be disadvantageous from the viewpoint of durability.

SUMMARY OF THE INVENTION

It is an object of the present invention to eliminate or at least mitigate the aforementioned problems of prior art. The present invention is to provide an improved endless transmission belt assembly which makes use of no less than two kinds of block elements which are different in shape, which serve to disperse the frequency range of the noise and reduce the overall noise level, and which yet provides a satisfactory durability.

To this end, according to the present invention, there is provided an endless transmission belt assembly adapted to be passed between driving and driven pulleys of a power transmission mechanism for transmitting power therebetween, said pulleys having circumferential belt grooves, respectively, said belt assembly comprising: an endless belt element of a laminated structure; and a number of segmentary block elements which are aligned in a longitudinal direction of the belt element, and which are adapted to be received in the belt groove of each said pulley; said block elements being each formed with a belt recess for passing said belt element therethrough with a contact surface which is brought into contact with innermost surface of the belt element, and further provided with a rocking edge which comes into contact with an adjacent block element as a relevant span portion of the belt assembly is wound around said pulleys, causing a rocking motion of the block element relative to said adjacent block element, said block elements each having a predetermined radial distance between the contact surface of the belt recess and the rocking edge; said block elements being constituted by no less than two kinds of block elements of mutually different radial distance between the contact surface of the recess and the rocking edge.

The present invention is particularly featured by provision of no less than two kinds segmentary block elements for constituting a transmission belt assembly, which makes it possible to avoid undesirable situation in which all the block elements are wound around the pulley at a constant time interval to increase the noise level at a specific frequency component. Consequently, the present invention serves to effectively disperse the frequency range of the noise and reduce the overall noise level, thereby significantly improving the acoustic and vibrational characteristics of the belt assembly.

According to one preferred embodiment of the present invention, the block elements are arranged such that block elements of mutually different radial distance between the contact surface of the belt recess and the rocking edge are arranged adjacent to each other.

The block elements may be constituted by three kinds of block elements of mutually different radial distance between the contact surface of the belt recess and the rocking edge. In this instance, a first, a second and a third block elements may be aligned in the longitudinal direction of the belt element one behind the other, such that any one of the first, second and third block elements having a radial distance between the contact surface of the belt recess and the rocking edge is arranged adjacent to remaining one of the first, second and third block elements having a different radial distance.

It is advantageous in many instances to constitute a belt assembly by substantially same number of different kinds of block elements.

The transmission belt assembly may be used for a power transmission mechanism in which the circumferential belt grooves in the pulleys are of a substantially V-shaped cross-section in a manner known, per se. In this instance, it is preferable for the block element to have a substantially V-shaped cross-section.

As in the aforementioned conventional transmission belt assembly, the endless belt element used in accordance with the present invention may be of a laminated structure which is formed of a plurality of metal belt layers.

BRIEF DESCRIPTION OF THE DRAWINGS

FIG. 1 is a view showing the structure of a preferred embodiment of the transmission belt assembly according to the present invention; and FIGS. 2 to 4 are front views of different kinds of block elements.

DESCRIPTION OF THE PREFERRED EMBODIMENTS

The present invention will now be explained in further detail by referring to the accompanying drawings, wherein FIG. 1 shows a transmission belt assembly according to one preferred embodiment of the present invention which can be suitably used in a power transmission mechanism, such as a continuously variable power transmission mechanism for an automotive vehicle to transmit power between driving and driven pulleys (not shown), each having circumferential belt grooves of substantially V-shaped cross-section.

As particularly shown in FIG. 1, the belt assembly includes a number of three kinds of segmentary block elements 1, 2 and 3 which are of substantially V-shaped cross-section so as to be received in the belt groove of each pulley. The block elements 1, 2 and 3 are aligned in longitudinal direction of a pair of endless belt elements 4, only one of which is shown in FIG. 1. The belt elements 4 are each of a laminated structure formed of a plurality of metal belt layers, and extend in parallel with each other on both sides of the block elements 1, 2 and 3. It has to be noted here that FIG. 1 schematically shows a span portion of the belt assembly which is wound about a pulley, and of which only limited number of the block elements 1, 2 and 3 are shown for the sake of clarity.

As shown in FIG. 2, the first kind of the block element 1 has a pair of inclined side surfaces 1a which are to be frictionally wedge-engaged with the V-shaped grooves of the driving and driven pulleys. Each side surface 1a is formed with a belt recess 1b for passing the relevant belt element 4 therethrough. Each belt recess 1b has a contact surface 1c which is brought into contact with innermost surface of the relevant belt element 4. The block element 1 has a front surface provided with an alignment protrusion 1d and a rocking edge 1e to be more fully explained hereinafter, and also a rear surface provided with an alignment recess 1f corresponding to the alignment protrusion 1d. The rocking edge 1e comes into contact with an adjacent block element as a relevant span portion of the belt assembly is wound around the pulleys, causing a rocking motion of the block element 1 relative to the adjacent block element. The block element 1 has a predetermined radial distance $h_1$ between the contact surface 1c of the belt recess 1b and the rocking edge 1e.

Similarly, as shown in FIGS. 3 and 4, the second and third kinds of the block elements 2, 3 have a pair of inclined side surfaces 2a, 3a which are formed with belt recess 2b, 3b having belt contact surface 2c, 3c, front surfaces with alignment protrusions 2d, 3d and rocking edges 2e, 3e, and also rear surfaces with alignment recesses 2f, 3f, respectively. The block elements 2, 3 have predetermined radial distance $h_2$, $h_3$ between the contact surfaces 2c, 3c of the belt recesses 2b, 3b and the rocking edges 2e, 3e, respectively.

As described above, the three kinds of the block elements 1, 2 and 3 are each formed into a substantially same configuration to perform substantially same function, while their radial distances $h_1$, $h_2$, $h_3$ between the contact surfaces 1c, 2c, 3c of the belt recesses 1b, 2b, 3b and the rocking edges 1e, 2e, 3e are respectively set to different value $h_1$, $h_2$, $h_3$, wherein the relation between the radial distances $h_1$, $h_2$, $h_3$ may be expressed as : $h_1 < h_2 < h_3$. A large number of block elements 1, 2 and 3 are used and arranged appropriately so as to compose one transmission belt assembly. In this instance, it is advantageous to form a transmission belt assembly by using substantially same number of the three kinds of block elements 1, 2 and 3.

The three kinds of block elements 1, 2 and 3 are advantageously arranged such that block elements of mutually different radial distance $h_1$, $h_2$, $h_3$ are arranged adjacent to each other. Preferably, in using the three kinds of block elements 1, 2 and 3, they are arranged in the longitudinal direction of the belt element 4 one behind the other such that any one of the first, second and third kinds of block elements has the radial distance between the contact surface of the recess and the rocking edge is arranged adjacent to remaining one of the first, second and third block elements having a different radial distance.

For example, as shown in FIG. 1, a belt assembly may be composed by accommodating two belt elements 4 into belt recesses 1b, 2b and 3b so that the block elements 1, 2 and 3 are arranged in the order of element 2, element 1, element 2, element 3, element 1, and so forth, as seen from right side toward left side in FIG. 1.

Specifically, in straight span portions of the belt assembly (not shown) other than the belt winding span portion shown in FIG. 1, the alignment protrusions 2d, 1d, 2d, 3d, etc. of the block elements 2, 1, 2, 3, etc. are respectively engaged within the alignment recesses 1f, 2f, 3f, 1f, etc., of the adjacent block elements 1, 2, 3, 1, etc., such that the block elements 1, 2 and 3 are closely engaged with each other successively in the longitudinal direction of the belt assembly.

The above-mentioned belt assembly according to the present invention can be utilized in such a manner, for example, that it is passed between the driving and driven pulleys of a continuously variable power transmission mechanism for an automotive vehicle. These pulleys are each composed of a stationary conical member which is held stationary in the axial direction, and a movable conical member which can be moved in the axial direction toward and away from the stationary conical member. The stationary and movable conical members are disposed such that their conical surfaces are arranged axially opposite to each other. In this type of power transmission mechanism, power from the driving pulley is transmitted by the belt assembly through the side wall of the V-shaped groove of the driving pulley and any one of the block elements 1, 2 or 3 in engagement therewith, the laminated belts 4, and any one of the block elements 1, 2 or 3 in engagement with the side wall of the V-shaped groove of the driven pulley, and then to the driven pulley.

The function of the illustrated embodiment will be explained below. As shown in FIG. 1, power is transmitted by the belt assembly which is wound around driving and driven pulleys under the condition that the contact surfaces 1c, 2c, 3c of the belt recesses 1b, 2b, 3b of the block elements 1, 2, 3 are contacted by the innermost peripheral surfaces of the laminated belts 4, i.e. the lower surfaces of the lowermost metallic belt layers in FIG. 1. On this occasion, the block elements 1, 2, 3 are respectively tilted about the rocking edges 1e, 2e, 3e as their tilting or rocking axes by a predetermined angle. Thus, the engagement between the alignment protrusions 1d, 2d, 3d of the block element 1, 2, 3 and the alignment recesses 1f, 2f, 3f of the adjacent block element 1, 2, 3 is released following the deflection or radius of winding curvature of the laminated belt 4 around the pulley. Each block element 1, 2, 3 undergoes a wedge-contact with the opposite side wall of the belt groove in the pulley to achieve a power transmission.

In this embodiment, three kinds of block elements 1, 2, 3 are utilized, so that the rocking edges do not form a pitch circle in a direct sense as in the case of conventional arrangement. Rather, the radial distances or the winding radii $R_1$, $R_2$, $R_3$ of the block elements 1, 2, 3 between the center O of the pulley and the rocking edges 1e, 2e, 3e define the respective pitch circles.

Assuming that the winding radius of the innermost peripheral surface of the laminated belt 4 is $R_b$, the radial distances $R_1$, $R_2$, $R_3$ can be respectively expressed as follows: $R_1 = R_b - h_1$; $R_2 = R_b - h_2$; and $R_3 = R_b - h_3$. Accordingly, time intervals $t_1$, $t_2$, $t_3$ with which the block elements 1, 2 and 3 are wound around the pulley are different, which can be expressed by the following equations $$t_1 = P/R_1\omega = P/(R_b - h_1)\omega \qquad (1)$$

$$t_2 = P/R_2\omega = P/(R_b - h_2)\omega \qquad (2)$$

$$t_3 = P/R_3\omega = P/(R_b - h_3)\omega \qquad (3)$$

where $\omega$ is the angular speed of the relevant pulley, and P is the pitch of the block elements as shown in FIG. 1.

It can be readily appreciated that, in accordance with the present invention wherein the transmission belt assembly is composed of at least two kinds of block elements which are different in shape, it is possible to effectively avoid a problem of an excessively increased peaky noise level at a specific frequency f (= 1/t) as was the case when the block elements are wound around the pulley at a constant time interval t.

The present invention makes it possible to disperse the dominant noise frequency range according to the increased number of kinds of the block elements, and to thereby lower the overall noise level and significantly improve the acoustic an vibrational performance of the belt assembly.

While the present invention has been explained with reference to a certain specific embodiment presented by way of example only, it is of course that various modifications and/or alterations may be made without departing from the scope of the invention which is defined in the appended claims.

What is claimed is:

1. An endless transmission belt assembly adapted to be passed between driving and driven pulleys of a power transmission mechanism for transmitting power therebetween, said pulleys having circumferential belt grooves, respectively, said belt assembly comprising:
    an endless belt element; and
    a number of segmentary block elements which are aligned in a longitudinal direction of the belt element, and which are adapted to be received in the belt groove of each said pulley;
    said block elements being each formed with a belt recess for passing said belt element therethrough with a contact surface which is brought into contact with innermost surface of the belt element, and further provided with a rocking edge which comes into contact with an adjacent block element as a relevant span portion of the belt assembly is wound around said pulleys, causing a rocking motion of the block element relative to said adjacent block element, said block elements each having a predetermined radial distance between the contact surface of the belt recess and the rocking edge;
    said block elements being constituted by no less than two kinds of block elements of mutually different radial distance between the contact surface of the belt recess and the rocking edge.

2. The transmission belt assembly as set forth in claim 1, wherein said block elements are arranged such that block elements of mutually different radial distance between the contact surface of the belt recess and the rocking edge are arranged adjacent to each other.

3. The transmission belt assembly as set forth in claim 1, wherein said block elements are constituted by three kinds of block elements of mutually different radial distance between the contact surface of the belt recess and the rocking edge.

4. The transmission belt assembly as set forth in claim 3, wherein a first, a second and a third block elements are aligned in the longitudinal direction of the belt element one behind the other, any one of said first, second and third block elements having a radial distance between the contact surface of the belt recess and the rocking edge being arranged adjacent to remaining one of said first, second and third block elements having a different radial distance.

5. The transmission belt assembly as set forth in claim 1, comprising substantially same number of different kinds of block elements.

6. The transmission belt assembly as set forth in claim 1, for a power transmission mechanism in which the circumferential belt grooves in said pulleys are of substantially V-shaped cross-section, wherein said block elements are of substantially V-shaped cross-section.

7. The transmission belt assembly as set forth in claim 1, wherein said endless belt element is of a laminated structure which is formed of plurality of metal belt layers.

* * * * *